United States Patent
Boykin

(10) Patent No.: US 10,165,171 B2
(45) Date of Patent: Dec. 25, 2018

(54) SYSTEMS, APPARATUSES, AND METHODS FOR CONTROLLING AUDIOVISUAL APPARATUSES

(71) Applicant: COBAN Technologies, Inc., Houston, TX (US)

(72) Inventor: Terry W. Boykin, Katy, TX (US)

(73) Assignee: Coban Technologies, Inc., Houston, TX (US)

( * ) Notice: Subject to any disclaimer, the term of this patent is extended or adjusted under 35 U.S.C. 154(b) by 0 days.

(21) Appl. No.: 15/412,044

(22) Filed: Jan. 22, 2017

(65) Prior Publication Data

US 2017/0214843 A1 Jul. 27, 2017

Related U.S. Application Data

(60) Provisional application No. 62/333,818, filed on May 9, 2016, provisional application No. 62/286,139, filed on Jan. 22, 2016.

(51) Int. Cl.
*H04N 7/18* (2006.01)
*H04N 5/232* (2006.01)

(52) U.S. Cl.
CPC ......... *H04N 5/23203* (2013.01); *H04N 7/185* (2013.01)

(58) Field of Classification Search
CPC ....... H04N 9/8211; H04N 5/77; H94M 11/04; G08B 13/19647
USPC .......................................................... 348/158
See application file for complete search history.

(56) References Cited

U.S. PATENT DOCUMENTS

| | | |
|---|---|---|
| 4,344,184 A | 8/1982 | Edwards |
| 4,543,665 A | 9/1985 | Sotelo et al. |
| 4,590,614 A | 5/1986 | Erat |
| 4,910,795 A | 3/1990 | McCowen et al. |
| 5,012,335 A | 4/1991 | Cohodar |
| 5,111,289 A | 5/1992 | Lucas et al. |
| 5,408,330 A | 4/1995 | Squicciarini et al. |
| 5,477,397 A | 12/1995 | Naimpally et al. |
| 5,613,032 A | 3/1997 | Cruz et al. |
| 5,724,475 A | 3/1998 | Kirsten |
| 5,815,093 A | 9/1998 | Kikinis |
| 5,841,978 A | 11/1998 | Rhoads |
| 5,862,260 A | 1/1999 | Rhoads |
| 5,926,218 A | 7/1999 | Smith |
| 5,946,343 A | 8/1999 | Schotz et al. |
| 5,970,098 A | 10/1999 | Herzberg |

(Continued)

FOREIGN PATENT DOCUMENTS

| | | |
|---|---|---|
| CN | 2907145 Y | 5/2007 |
| CN | 101309088 A | 11/2008 |

(Continued)

OTHER PUBLICATIONS

Office Action issued in U.S. Appl. No. 11/369,502 dated Mar. 16, 2010, 10 pages.

(Continued)

*Primary Examiner* — Tung T Vo
(74) *Attorney, Agent, or Firm* — JL Salazar Law Firm

(57) ABSTRACT

Systems and methods for automatically controlling audiovisual apparatuses. A portable camera and a docking module configured to wirelessly trigger the camera to activate/deactivate the buffering and storage of data captured by the camera.

21 Claims, 7 Drawing Sheets

(56) References Cited

U.S. PATENT DOCUMENTS

| | | |
|---|---|---|
| 6,002,326 A | 12/1999 | Turner |
| 6,009,229 A | 12/1999 | Kawamura |
| 6,028,528 A | 2/2000 | Lorenzetti et al. |
| 6,038,257 A | 3/2000 | Brusewitz et al. |
| 6,122,403 A | 9/2000 | Rhoads |
| 6,141,611 A | 10/2000 | MacKey et al. |
| 6,163,338 A | 12/2000 | Johnson et al. |
| 6,175,860 B1 | 1/2001 | Gaucher |
| 6,181,711 B1 | 1/2001 | Zhang et al. |
| 6,275,773 B1 | 8/2001 | Lemelson et al. |
| 6,298,290 B1 | 10/2001 | Abe et al. |
| 6,346,965 B1 | 2/2002 | Toh |
| 6,405,112 B1 | 6/2002 | Rayner |
| 6,411,874 B2 | 6/2002 | Morgan et al. |
| 6,421,080 B1 | 7/2002 | Lambert |
| 6,424,820 B1 | 7/2002 | Burdick et al. |
| 6,462,778 B1 | 10/2002 | Abram et al. |
| 6,505,160 B1 | 1/2003 | Levy et al. |
| 6,510,177 B1 | 1/2003 | De Bonet et al. |
| 6,518,881 B2 | 2/2003 | Monroe |
| 6,624,611 B2 | 9/2003 | Kirmuss |
| 6,778,814 B2 | 8/2004 | Koike |
| 6,788,338 B1 | 9/2004 | Dinev et al. |
| 6,788,983 B2 | 9/2004 | Zheng |
| 6,789,030 B1 | 9/2004 | Coyle et al. |
| 6,791,922 B2 | 9/2004 | Suzuki |
| 6,825,780 B2 | 11/2004 | Saunders et al. |
| 6,831,556 B1 | 12/2004 | Boykin |
| 7,010,328 B2 | 3/2006 | Kawasaki et al. |
| 7,091,851 B2 | 8/2006 | Mason et al. |
| 7,119,832 B2 | 10/2006 | Blanco et al. |
| 7,120,477 B2 | 10/2006 | Huang |
| 7,155,615 B1 | 12/2006 | Silvester |
| 7,167,519 B2 | 1/2007 | Comaniciu et al. |
| 7,190,882 B2 | 3/2007 | Gammenthaler |
| 7,231,233 B2 | 6/2007 | Gosieski, Jr. |
| 7,272,179 B2 | 9/2007 | Siemens et al. |
| 7,317,837 B2 | 1/2008 | Yatabe et al. |
| 7,356,473 B2 | 4/2008 | Kates |
| 7,386,219 B2 | 6/2008 | Ishige |
| 7,410,371 B2 | 8/2008 | Shabtai et al. |
| 7,414,587 B2 | 8/2008 | Stanton |
| 7,428,314 B2 | 9/2008 | Henson |
| 7,515,760 B2 | 4/2009 | Sai et al. |
| 7,542,813 B2 | 6/2009 | Nam |
| 7,551,894 B2 | 6/2009 | Gerber et al. |
| 7,554,587 B2 | 6/2009 | Shizukuishi |
| 7,618,260 B2 | 11/2009 | Daniel et al. |
| 7,631,195 B1 | 12/2009 | Yu et al. |
| 7,688,203 B2 | 3/2010 | Rockefeller et al. |
| 7,693,289 B2 | 4/2010 | Stathem et al. |
| 7,768,548 B2 | 8/2010 | Silvernail et al. |
| 7,778,601 B2 | 8/2010 | Seshadri et al. |
| 7,792,189 B2 | 9/2010 | Finizio et al. |
| 7,818,078 B2 | 10/2010 | Iriarte |
| 7,835,530 B2 | 11/2010 | Avigni |
| 7,868,912 B2 | 1/2011 | Venetianer et al. |
| 7,877,115 B2 | 1/2011 | Seshadri et al. |
| 7,974,429 B2 | 7/2011 | Tsai |
| 7,995,652 B2 | 8/2011 | Washington |
| 8,068,023 B2 | 11/2011 | Dulin et al. |
| 8,081,214 B2 | 12/2011 | Vanman et al. |
| 8,086,277 B2 | 12/2011 | Ganley et al. |
| 8,121,306 B2 | 2/2012 | Cilia et al. |
| 8,126,276 B2 | 2/2012 | Bolle et al. |
| 8,126,968 B2 | 2/2012 | Rodman et al. |
| 8,139,796 B2 | 3/2012 | Nakashima et al. |
| 8,144,892 B2 | 3/2012 | Shemesh et al. |
| 8,145,134 B2 | 3/2012 | Henry et al. |
| 8,150,089 B2 | 4/2012 | Segawa et al. |
| 8,154,666 B2 | 4/2012 | Mody |
| 8,166,220 B2 | 4/2012 | Ben-Yacov et al. |
| 8,174,577 B2 | 5/2012 | Chou |
| 8,195,145 B2 | 6/2012 | Angelhag |
| 8,208,024 B2 | 6/2012 | Dischinger |
| 8,228,364 B2 | 7/2012 | Cilia |
| 8,230,149 B1 | 7/2012 | Long et al. |
| 8,253,796 B2 | 8/2012 | Renkis |
| 8,254,844 B2 | 8/2012 | Kuffner et al. |
| 8,260,217 B2 | 9/2012 | Chang et al. |
| 8,264,540 B2 | 9/2012 | Chang et al. |
| 8,270,647 B2 | 9/2012 | Crawford et al. |
| 8,289,370 B2 | 10/2012 | Civanlar et al. |
| 8,300,863 B2 | 10/2012 | Knudsen et al. |
| 8,311,549 B2 | 11/2012 | Chang et al. |
| 8,311,983 B2 | 11/2012 | Guzik |
| 8,358,980 B2 | 1/2013 | Tajima et al. |
| 8,380,131 B2 | 2/2013 | Chiang |
| 8,422,944 B2 | 4/2013 | Flygh et al. |
| 8,446,469 B2 | 5/2013 | Blanco et al. |
| 8,457,827 B1 | 6/2013 | Ferguson et al. |
| 8,489,065 B2 | 7/2013 | Green et al. |
| 8,489,151 B2 | 7/2013 | Engelen et al. |
| 8,497,940 B2 | 7/2013 | Green et al. |
| 8,554,145 B2 | 10/2013 | Fehr |
| 8,612,708 B2 | 12/2013 | Drosch |
| 8,630,908 B2 | 1/2014 | Forster |
| 8,661,507 B1 | 2/2014 | Hesselink et al. |
| 8,707,392 B2 | 4/2014 | Birtwhistle et al. |
| 8,731,742 B2 | 5/2014 | Zagorski et al. |
| 8,780,199 B2 | 7/2014 | Mimar |
| 8,781,292 B1 | 7/2014 | Ross et al. |
| 8,849,557 B1 | 9/2014 | Levandowski et al. |
| 9,041,803 B2 | 5/2015 | Chen et al. |
| 9,070,289 B2 | 6/2015 | Saund et al. |
| 9,159,371 B2 | 10/2015 | Ross et al. |
| 9,201,842 B2 | 12/2015 | Plante |
| 9,225,527 B1 | 12/2015 | Chang |
| 9,253,452 B2 | 2/2016 | Ross et al. |
| 9,307,317 B2 | 4/2016 | Chang et al. |
| 9,325,950 B2 | 4/2016 | Haler |
| 9,471,059 B1 | 10/2016 | Wilkins |
| 9,589,448 B1 | 3/2017 | Schneider et al. |
| 9,665,094 B1 | 5/2017 | Russell |
| 10,074,394 B2 | 9/2018 | Ross et al. |
| 2002/0003571 A1 | 1/2002 | Schofield et al. |
| 2002/0051061 A1 | 5/2002 | Peters et al. |
| 2002/0135679 A1 | 9/2002 | Scaman |
| 2003/0052970 A1 | 3/2003 | Dodds et al. |
| 2003/0080878 A1 | 5/2003 | Kirmuss |
| 2003/0081122 A1* | 5/2003 | Kirmuss ............... B60R 11/02 348/148 |
| 2003/0081127 A1* | 5/2003 | Kirmuss ............... B60R 11/02 348/207.99 |
| 2003/0081128 A1* | 5/2003 | Kirmuss ............... B60R 11/02 348/207.99 |
| 2003/0081934 A1* | 5/2003 | Kirmuss ............... B60R 11/02 386/224 |
| 2003/0081935 A1 | 5/2003 | Kirmuss |
| 2003/0095688 A1 | 5/2003 | Kirmuss |
| 2003/0103140 A1 | 6/2003 | Watkins |
| 2003/0151663 A1 | 8/2003 | Lorenzetti et al. |
| 2003/0197629 A1 | 10/2003 | Saunders et al. |
| 2004/0008255 A1 | 1/2004 | Lewellen |
| 2004/0051793 A1 | 3/2004 | Tecu et al. |
| 2004/0107030 A1 | 6/2004 | Nishira et al. |
| 2004/0146272 A1 | 7/2004 | Kessel et al. |
| 2004/0177253 A1 | 9/2004 | Wu et al. |
| 2005/0007458 A1 | 1/2005 | Benattou |
| 2005/0078195 A1* | 4/2005 | VanWagner ........... H04M 11/04 348/231.3 |
| 2005/0083404 A1 | 4/2005 | Pierce et al. |
| 2005/0088521 A1 | 4/2005 | Blanco et al. |
| 2005/0122397 A1 | 6/2005 | Henson et al. |
| 2005/0154907 A1 | 7/2005 | Han et al. |
| 2005/0158031 A1 | 7/2005 | David |
| 2005/0185936 A9 | 8/2005 | Lao et al. |
| 2005/0243171 A1 | 11/2005 | Ross, Sr. et al. |
| 2005/0286476 A1 | 12/2005 | Crosswy et al. |
| 2006/0055521 A1 | 3/2006 | Blanco et al. |
| 2006/0072672 A1 | 4/2006 | Holcomb et al. |
| 2006/0077256 A1 | 4/2006 | Silvemail et al. |
| 2006/0078046 A1 | 4/2006 | Lu |
| 2006/0130129 A1 | 6/2006 | Dai et al. |

(56) References Cited

U.S. PATENT DOCUMENTS

| | | |
|---|---|---|
| 2006/0133476 A1 | 6/2006 | Page et al. |
| 2006/0165386 A1 | 7/2006 | Garoutte |
| 2006/0270465 A1 | 11/2006 | Lee et al. |
| 2006/0274116 A1 | 12/2006 | Wu |
| 2007/0005609 A1 | 1/2007 | Breed |
| 2007/0064108 A1 | 3/2007 | Haler |
| 2007/0086601 A1 | 4/2007 | Mitchler |
| 2007/0111754 A1 | 5/2007 | Marshall et al. |
| 2007/0124292 A1 | 5/2007 | Kirshenbaum et al. |
| 2007/0217761 A1 | 9/2007 | Chen et al. |
| 2007/0219685 A1 | 9/2007 | Plante |
| 2008/0005472 A1 | 1/2008 | Khalidi et al. |
| 2008/0030782 A1 | 2/2008 | Watanabe |
| 2008/0129825 A1 | 6/2008 | DeAngelis et al. |
| 2008/0165250 A1 | 7/2008 | Ekdahl et al. |
| 2008/0186129 A1 | 8/2008 | Fitzgibbon |
| 2008/0208755 A1 | 8/2008 | Malcolm |
| 2008/0294315 A1 | 11/2008 | Breed |
| 2008/0303903 A1 | 12/2008 | Bentley et al. |
| 2009/0017881 A1 | 1/2009 | Madrigal |
| 2009/0022362 A1 | 1/2009 | Gagvani et al. |
| 2009/0074216 A1 | 3/2009 | Bradford et al. |
| 2009/0076636 A1 | 3/2009 | Bradford et al. |
| 2009/0118896 A1 | 5/2009 | Gustafsson |
| 2009/0195651 A1 | 8/2009 | Leonard et al. |
| 2009/0195655 A1* | 8/2009 | Pandey ............ G08B 13/19647 |
| | | 348/158 |
| 2009/0213902 A1 | 8/2009 | Jeng |
| 2010/0026809 A1 | 2/2010 | Curry |
| 2010/0030929 A1 | 2/2010 | Ben-Yacov et al. |
| 2010/0057444 A1 | 3/2010 | Cilia |
| 2010/0081466 A1 | 4/2010 | Mao |
| 2010/0131748 A1 | 5/2010 | Lin |
| 2010/0136944 A1 | 6/2010 | Taylor et al. |
| 2010/0180051 A1 | 7/2010 | Harris |
| 2010/0238009 A1 | 9/2010 | Cook et al. |
| 2010/0274816 A1 | 10/2010 | Guzik |
| 2010/0287545 A1 | 11/2010 | Corbefin |
| 2010/0289648 A1 | 11/2010 | Ree |
| 2010/0302979 A1 | 12/2010 | Reunamaki |
| 2010/0309971 A1 | 12/2010 | Vanman et al. |
| 2011/0016256 A1 | 1/2011 | Hatada |
| 2011/0044605 A1 | 2/2011 | Vanman et al. |
| 2011/0092248 A1 | 4/2011 | Evanitsky |
| 2011/0142156 A1 | 6/2011 | Haartsen |
| 2011/0233078 A1 | 9/2011 | Monaco et al. |
| 2011/0234379 A1 | 9/2011 | Lee |
| 2011/0280143 A1 | 11/2011 | Li et al. |
| 2011/0280413 A1 | 11/2011 | Wu et al. |
| 2011/0299457 A1 | 12/2011 | Green, III et al. |
| 2012/0014534 A1 | 1/2012 | Bodley et al. |
| 2012/0078397 A1 | 3/2012 | Lee et al. |
| 2012/0083960 A1 | 4/2012 | Zhu et al. |
| 2012/0163309 A1 | 6/2012 | Ma et al. |
| 2012/0173577 A1 | 7/2012 | Millar et al. |
| 2012/0266251 A1 | 10/2012 | Birtwhistle et al. |
| 2012/0300081 A1 | 11/2012 | Kim |
| 2012/0307070 A1 | 12/2012 | Pierce |
| 2012/0310394 A1 | 12/2012 | El-Hoiydi |
| 2012/0310395 A1 | 12/2012 | El-Hoiydi |
| 2013/0114849 A1 | 5/2013 | Pengelly et al. |
| 2013/0135472 A1 | 5/2013 | Wu et al. |
| 2013/0163822 A1 | 6/2013 | Chigos et al. |
| 2013/0201884 A1 | 8/2013 | Freda et al. |
| 2013/0218427 A1 | 8/2013 | Mukhopadhyay et al. |
| 2013/0223653 A1 | 8/2013 | Chang |
| 2013/0236160 A1 | 9/2013 | Gentile et al. |
| 2013/0242262 A1 | 9/2013 | Lewis |
| 2013/0251173 A1 | 9/2013 | Ejima et al. |
| 2013/0268357 A1 | 10/2013 | Heath |
| 2013/0287261 A1 | 10/2013 | Lee et al. |
| 2013/0302758 A1 | 11/2013 | Wright |
| 2013/0339447 A1 | 12/2013 | Ervine |
| 2013/0346660 A1 | 12/2013 | Kwidzinski et al. |
| 2014/0037142 A1 | 2/2014 | Bhanu et al. |
| 2014/0038668 A1 | 2/2014 | Vasavada et al. |
| 2014/0078304 A1 | 3/2014 | Othmer |
| 2014/0085475 A1 | 3/2014 | Bhanu et al. |
| 2014/0092251 A1 | 4/2014 | Troxel |
| 2014/0100891 A1 | 4/2014 | Turner et al. |
| 2014/0114691 A1 | 4/2014 | Pearce |
| 2014/0143545 A1 | 5/2014 | McKeeman et al. |
| 2014/0162598 A1 | 6/2014 | Villa-Real |
| 2014/0184796 A1 | 7/2014 | Klein et al. |
| 2014/0236414 A1 | 8/2014 | Droz et al. |
| 2014/0236472 A1 | 8/2014 | Rosario |
| 2014/0278052 A1 | 9/2014 | Slavin et al. |
| 2014/0280584 A1 | 9/2014 | Ervine |
| 2014/0281498 A1 | 9/2014 | Bransom et al. |
| 2014/0297687 A1 | 10/2014 | Lin |
| 2014/0309849 A1 | 10/2014 | Ricci |
| 2014/0321702 A1 | 10/2014 | Schmalstieg |
| 2014/0355951 A1 | 12/2014 | Tabak |
| 2014/0375807 A1 | 12/2014 | Muetzel et al. |
| 2015/0012825 A1 | 1/2015 | Rezvani et al. |
| 2015/0032535 A1 | 1/2015 | Li et al. |
| 2015/0066349 A1 | 3/2015 | Chan et al. |
| 2015/0084790 A1 | 3/2015 | Arpin et al. |
| 2015/0086175 A1* | 3/2015 | Lorenzetti ............ H04N 9/8211 |
| | | 386/226 |
| 2015/0088335 A1 | 3/2015 | Lambert et al. |
| 2015/0103159 A1 | 4/2015 | Shashua et al. |
| 2015/0161483 A1 | 6/2015 | Allen et al. |
| 2015/0211868 A1 | 7/2015 | Matsushita et al. |
| 2015/0266575 A1 | 9/2015 | Borko |
| 2015/0294174 A1 | 10/2015 | Karkowski et al. |
| 2016/0023762 A1 | 1/2016 | Wang |
| 2016/0035391 A1 | 2/2016 | Ross et al. |
| 2016/0042767 A1* | 2/2016 | Araya .................... G11B 19/02 |
| | | 386/201 |
| 2016/0062762 A1 | 3/2016 | Chen et al. |
| 2016/0062992 A1 | 3/2016 | Chen et al. |
| 2016/0063642 A1 | 3/2016 | Luciani et al. |
| 2016/0064036 A1 | 3/2016 | Chen et al. |
| 2016/0065908 A1 | 3/2016 | Chang et al. |
| 2016/0144788 A1 | 5/2016 | Perrin et al. |
| 2016/0148638 A1 | 5/2016 | Ross et al. |
| 2016/0285492 A1* | 9/2016 | Vembar ................. H04B 1/385 |
| 2016/0332747 A1 | 11/2016 | Bradlow et al. |
| 2017/0032673 A1 | 2/2017 | Scofield et al. |
| 2017/0053169 A1 | 2/2017 | Cuban et al. |
| 2017/0053674 A1 | 2/2017 | Fisher et al. |
| 2017/0059265 A1* | 3/2017 | Winter .................... F41A 17/08 |
| 2017/0066374 A1 | 3/2017 | Hoye |
| 2017/0076396 A1 | 3/2017 | Sudak |
| 2017/0085829 A1* | 3/2017 | Waniguchi ................ H04N 5/77 |
| 2017/0113664 A1 | 4/2017 | Nix |
| 2017/0178422 A1 | 6/2017 | Wright |
| 2017/0178423 A1 | 6/2017 | Wright |
| 2017/0193828 A1 | 7/2017 | Holtzman et al. |
| 2017/0253330 A1 | 9/2017 | Saigh et al. |
| 2017/0324897 A1 | 11/2017 | Swaminathan et al. |

FOREIGN PATENT DOCUMENTS

| | | |
|---|---|---|
| CN | 102355618 A | 2/2012 |
| CN | 102932703 A | 2/2013 |
| CN | 202957973 U | 5/2013 |
| CN | 103617005 A | 3/2014 |
| EP | 1148726 A2 | 10/2001 |
| EP | 1655855 A1 | 5/2006 |
| EP | 2107837 A1 | 10/2009 |
| GB | 2391687 A | 11/2004 |
| JP | 2003150450 A | 5/2003 |
| JP | 2005266934 A | 9/2005 |
| JP | 2009169922 A | 7/2009 |
| JP | 2012058832 A | 3/2012 |
| WO | 1997038526 A1 | 10/1997 |
| WO | 2000013410 A1 | 3/2000 |
| WO | 2000021258 A1 | 4/2000 |
| WO | 2000045587 A2 | 8/2000 |
| WO | 2000072186 A2 | 11/2000 |
| WO | 2002061955 A2 | 8/2002 |
| WO | 2004066590 A2 | 8/2004 |

(56) References Cited

FOREIGN PATENT DOCUMENTS

| WO | 2004111851 A | 12/2004 |
|---|---|---|
| WO | 2005053325 A2 | 6/2005 |
| WO | 2005054997 A2 | 6/2005 |
| WO | 2007114988 | 10/2007 |
| WO | 2009058611 A1 | 5/2009 |
| WO | 2009148374 A1 | 12/2009 |
| WO | 2012001143 A1 | 1/2012 |
| WO | 2012100114 A2 | 7/2012 |
| WO | 2012116123 A2 | 8/2012 |
| WO | 2013020588 A1 | 2/2013 |
| WO | 2013074947 A2 | 5/2013 |
| WO | 2013106740 A2 | 7/2013 |
| WO | 2013107516 A1 | 7/2013 |
| WO | 2013150326 A1 | 10/2013 |
| WO | 2014057496 A2 | 4/2014 |
| WO | 2016033523 A1 | 3/2016 |
| WO | 2016061516 A1 | 4/2016 |
| WO | 2016061525 A1 | 4/2016 |
| WO | 2016061533 A1 | 4/2016 |

OTHER PUBLICATIONS

Office Action issued in U.S. Appl. No. 11/369,502 dated Sep. 30, 2010, 12 pages.
Office Action issued in U.S. Appl. No. 11/369,502 dated Jul. 14, 2011, 17 pages.
Office Action issued in U.S. Appl. No. 11/369,502 dated Jan. 31, 2012, 18 pages.
Examiner's Answer (to Appeal Brief) issued in U.S. Appl. No. 11/369,502 dated Oct. 24, 2012, 20 pages.
Office Action issued in U.S. Appl. No. 13/723,747 dated Mar. 22, 2013, 6 pages.
Office Action issued in U.S. Appl. No. 13/723,747 dated Jun. 26, 2013, 6 pages.
Office Action issued in U.S. Appl. No. 13/723,747 dated Sep. 10, 2013, 7 pages.
Advisory Action issued in U.S. Appl. No. 13/723,747 dated Feb. 24, 2014, 4 pages.
Office Action issued in U.S. Appl. No. 13/723,747 dated Mar. 20, 2014, 6 pages.
Office Action issued in U.S. Appl. No. 13/723,747 dated Nov. 10, 2014, 9 pages.
Notice of Allowance and Fees Due issued in U.S. Appl. No. 13/723,747 dated Mar. 30, 2015, 6 pages.
First Action Interview Pilot Program Pre-Interview Communication issued in U.S. Appl. No. 14/588,139 dated May 14, 2015, 4 pages.
Office Action issued in U.S. Appl. No. 14/593,853 dated Apr. 20, 2015, 30 pages.
Office Action issued in U.S. Appl. No. 14/593,956 dated May 6, 2015, 10 pages.
PCT International Search Report and Written Opinion issued in Application No. PCT/US07/63485 dated Feb. 8, 2008, 10 pages.
Chapter 5: "Main Memory," Introduction to Computer Science course, 2004, 20 pages, available at http://www2.cs.ucy.ac.cy/~nicolast/courses/lectures/MainMemory.pdf.
Sony Corporation, Digital Still Camera (MVC-CD200/CD300), Operation Manual, 2001, 108 pages, Sony, Japan.
Steve's Digicams, Kodak Professional DCS 620 Digital Camera, 1999, 11 pages, United States, available at: http://www.steves-digicams.com/dcs620.html.
Gregory J. Allen, "The Feasibility of Implementing Video Teleconferencing Systems Aboard Afloat Naval Units" (Master's Thesis, Naval Postgraduate School, Monterey, California), Mar. 1990, 143 pages.
Bell-Northern Research Ltd., "A Multi-Bid Rate Interframe Movement Compensated Multimode Coder for Video Conferencing" (Final Report prepared for DARPA), Apr. 1982, 92 pages, Ottawa, Ontario, Canada.
Xiaoqing Zhu, Eric Setton, Bernd Girod, "Rate Allocation for Multi-Camera Surveillance Over an Ad Hoc Wireless Network," 2004, 6 pages, available at http://msw3.stanford.edu/~zhuxq/papers/pcs2004.pdf.
Office Action issued in U.S. Appl. No. 14/593,722 dated Sep. 25, 2015, 39 pages.
Office Action issued in U.S. Appl. No. 14/593,853 dated Sep. 11, 2015 (including Summary of Interview conducted on May 9, 2015), 45 pages.
Notice of Allowance issued in U.S. Appl. No. 14/593,956 dated Oct. 26, 2015, 10 pages.
"IEEE 802.1X," Wikipedia, Aug. 23, 2013, 8 pages, available at: http://en.wikipedia.org/w/index.php?title=IEEE_802.1X&oldid=569887090.
Notice of Allowance issued in U.S. Appl. No. 14/588,139 dated Aug. 14, 2015, 19 pages.
"Near Field Communication," Wikipedia, Jul. 19, 2014, 8 pages, available at: hilps://en.wikipedia.org/w/index.php?title=near_field_communication&oldid=617538619.
PCT International Search Report and Written Opinion issued in Application No. PCT/US15/47532 dated Jan. 8, 2016, 22 pages.
Office Action issued in U.S. Appl. No. 14/686,192 dated Apr. 8, 2016, 19 pages.
Office Action issued in U.S. Appl. No. 14/715,742 dated Aug. 21, 2015, 13 pages.
Office Action issued in U.S. Appl. No. 14/715,742 dated Mar. 11, 2016, 14 pages.
Office Action issued in U.S. Appl. No. 14/593,722 dated Apr. 10, 2015, 28 pages.
Office Action issued in U.S. Appl. No. 14/686,192 dated Dec. 24, 2015, 12 pages.
"Portable Application," Wikipedia, Jun. 26, 2014, 4 pages, available at: http://en.wikipedia.org/w/index.php?title=Portable_application&oldid=614543759.
"Radio-Frequency Identification," Wikipedia, Oct. 18, 2013, 31 pages, available at: http://en.wikipedia.org/w/index.php?title=Radio-frequency_identification&oldid=577711262.
Advisory Action issued in U.S. Appl. No. 14/715,742 dated May 20, 2016 (including Summary of Interview conducted on May 12, 2016), 4 pages.
Advisory Action issued in U.S. Appl. No. 14/715,742 dated Jun. 14, 2016, 3 pages.
Office Action issued in U.S. Appl. No. 14/715,742 dated Sep. 23, 2016, 17 pages.
Office Action issued in U.S. Appl. No. 15/413,205 dated Mar. 17, 2017, 7 pages.
Office Action issued in U.S. Appl. No. 15/438,166 dated Apr. 21, 2017, 17 pages.
U.S. Appl. No. 62/197,493 (Fisher et al.), filed Jul. 27, 2015, 12 pages.
Office Action issued in U.S. Appl. No. 15/467,924 dated May 8, 2017, 10 pages.

* cited by examiner

SYSTEMS, APPARATUSES, AND METHODS FOR CONTROLLING AUDIOVISUAL APPARATUSES

CROSS-REFERENCE TO RELATED APPLICATIONS

This application claims priority to U.S. Provisional Patent Application No. 62/333,818, filed on May 9, 2016, titled "Systems, Apparatuses and Methods for Creating, Identifying, Enhancing, and Distributing Evidentiary Data" and to U.S. Provisional Patent Application No. 62/286,139, filed on Jan. 22, 2016, titled "Systems, Apparatuses and Methods for Securely Attaching Wearable Devices." The entire disclosures of Application No. 62/333,818 and Application No. 62/286,139 are hereby incorporated herein by reference.

STATEMENT REGARDING FEDERALLY SPONSORED RESEARCH

Not Applicable.

TECHNICAL FIELD OF THE INVENTION

This disclosure relates generally to techniques for controlling audiovisual apparatuses. More particularly, but not by way of limitation, this disclosure relates to systems and methods for automatic wireless activation and control of portable audiovisual devices.

BACKGROUND

Today's law enforcement officers have various means of technology at their disposal to perform their tasks. Police vehicles are typically equipped with video/audio equipment that captures on-scene information that is commonly used as evidence in legal proceedings. More recently, officers have begun to use body-worn-cameras (BWC) to capture on-scene audio and video while on patrol. However, while technology has provided law enforcement officers powerful tools to perform their jobs, it has also added a level of complexity for officers on patrol.

An officer on patrol performs a number of tasks in addition to controlling the vehicle, including addressing bulletins and communications, running checks on license plate numbers, scanning for identified suspects and vehicles, etc. The BWCs present an additional peace of gear that the officer has to contend with. In the heat of a sudden emergency, the officer may not always remember to activate his BWC. Thus, while modern technology has provided law enforcement officers better tools to perform their jobs, the tools still have to be activated and operated. In addition to law enforcement, other institutions and establishments (e.g., armored car officers, emergency responders, firemen, inspectors, interviewers, etc.) can make use of BWCs.

A need remains for techniques to improve the operation and control of audiovisual technology as used for law enforcement and other functions.

SUMMARY

In view of the aforementioned problems and trends, embodiments of the present invention provide systems and methods for automatically controlling one or more audiovisual apparatuses such as camera devices that capture data (audio, video, and metadata).

According to an aspect of the invention, a method includes wirelessly linking a portable camera with a docking module disposed in a vehicle, wherein the camera is disposed remote from the docking module and wherein the portable camera is configured to capture image data and is configured with a buffer to temporarily hold captured image data and a memory to store captured image data; and using the docking module, sending a wireless command to the portable camera if a specified condition is met, wherein the command causes performance of one or more actions selected from the group consisting of: (a) causing image data captured by the portable camera to be temporarily held in the buffer; (b) causing image data captured by the portable camera not to be held in the buffer; (c) causing image data captured by the portable camera to be stored in the memory; and (d) causing image data captured by the portable camera not to be stored in the memory.

According to another aspect of the invention, a method includes wirelessly linking a portable camera with a docking module disposed in a vehicle, wherein the camera is disposed remote from the docking module and wherein the portable camera is configured to capture image data and temporarily hold the captured image data in a buffer in a continuous circulating stream; and using the docking module, sending a wireless command to the portable camera if a specified condition is met, wherein the command causes performance of one or more actions selected from the group consisting of: (a) causing image data captured by the portable camera not to be held in the buffer; (b) causing image data held in the buffer to be transferred to a memory in the portable camera; (c) causing image data captured by the portable camera to be stored in the memory; and (d) causing image data captured by the portable camera not to be stored in the memory.

According to another aspect of the invention, a system includes a docking module disposed in a vehicle; a portable camera disposed remote from the docking module; wherein the portable camera is wirelessly linked with the docking module and configured to capture image data and configured with a buffer to temporarily hold captured image data and a memory to store captured image data; and wherein the docking module is configured to send a wireless command to the portable camera if a specified condition is met, wherein the command is to cause performance of one or more actions selected from the group consisting of: (a) to cause image data captured by the portable camera to be temporarily held in the buffer; (b) to cause image data captured by the portable camera not to be held in the buffer; (c) to cause image data captured by the portable camera to be stored in the memory; and (d) to cause image data captured by the portable camera not to be stored in the memory.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

NOTATION AND NOMENCLATURE

Figure 1:
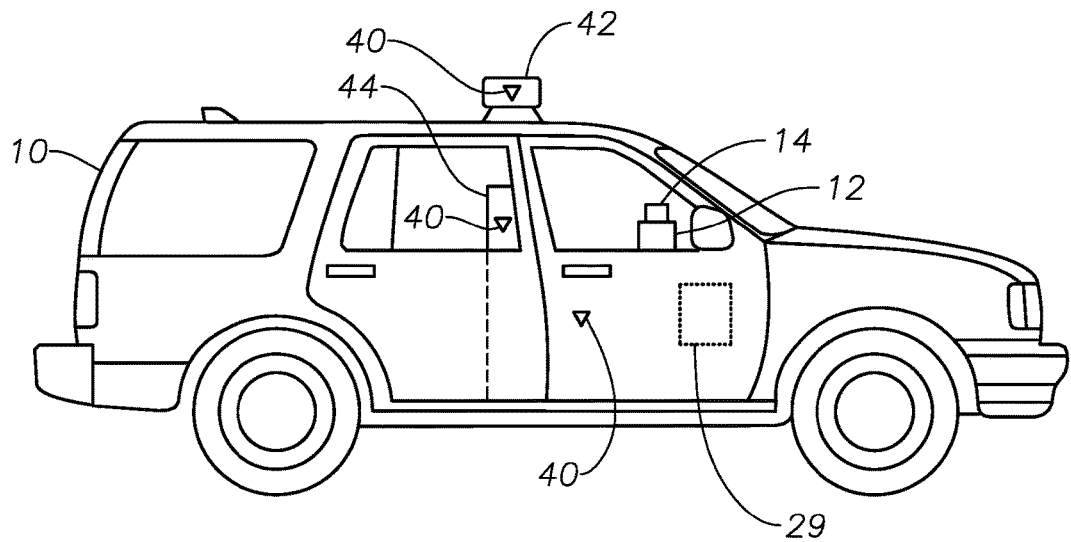
FIG. 1, in accordance with some embodiments of the present disclosure, depicts a vehicle configured with a camera device and a docking module.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" (and the like) and "comprising" (and the like) are used in an open-ended fashion, and thus should be interpreted to mean "including, but not limited to . . . ." Also, the term "couple," "coupled," or "linked" is intended to mean either an indirect or direct electrical, mechanical, or wireless connection. Thus, if a first device couples to or is linked to a second device, that connection may be through a direct electrical, mechanical, or wireless connection, or through an indirect electrical, mechanical, or wireless connection via other devices and connections.

As used throughout this disclosure the term "computer" encompasses special purpose microprocessor-based devices such as a digital video surveillance system primarily configured for executing a limited number of applications, and general purpose computers such as laptops, workstations, or servers which may be configured by a user to run any number of off the shelf or specially designed software applications. Computer systems and computer devices will generally interact in the same way with elements and aspects of disclosed embodiments. This disclosure also refers to memory or storage devices and storage drives interchangeably. In general, memory or a storage device/drive represents a medium accessible by a computer (via wired or wireless connection) to store data and computer program instructions. It will also be appreciated that use of the term "microprocessor" in this disclosure encompasses one or more processors.

The terms "video data" and "visual data" refer to still image data, moving image data, or both still and moving image data, as traditionally understood. Further, the terms "video data" and "visual data" refer to such image data alone, i.e., without audio data and without metadata. The term "image data" (in contrast to "still image data" and "moving image data") encompasses not only video or visual data but also audio data and/or metadata. That is, image data may include visual or video data, audio data, metadata, or any combination of these three. This image data may be compressed using industry standard compression technology (e.g., Motion Picture Expert Group (MPEG) standards, Audio Video Interleave (AVI), etc.) or another proprietary compression or storage format. The terms "camera," "camera device," and the like are understood to encompass devices configured to record or capture visual/video data or image data. Such devices may also be referred to as video recording devices, image capture devices, or the like. Metadata may be included in the files containing the video (or audio and video) data or in separate, associated data files, that may be configured in a structured text format such as eXtensible Markup Language (XML).

As used throughout this disclosure the term "record" is interchangeable with the term "store" and refers to the retention of image data in a storage medium designed for long-term retention (e.g., solid state memory, hard disk, CD, DVD, memory card, etc.), as compared to the temporary retention offered by conventional memory means such as volatile RAM. The temporary retention of data, image data or otherwise, is referred to herein as the "holding" of data or as data being "held."

The term "metadata" refers to information associated with the recording of video (or audio and video) data, or information included in the recording of image data, and metadata may contain information describing attributes associated with one or more acts of actual recording of video data, audio and video data, or image data. That is, the metadata may describe who (e.g., Officer ID) or what (e.g., automatic trigger) initiated or performed the recording. The metadata may also describe where the recording was made. Metadata may also include telemetry or other types of data. For example, location may be obtained using global positioning system (GPS) information or other telemetry information. The metadata may also describe why the recording was made (e.g., event tag describing the nature of the subject matter recorded). The metadata may also describe when the recording was made, using timestamp information obtained in association with GPS information or from an internal clock, for example, for the first frame of a recording or each individual frame may also have time information inserted that can be used to synchronize multiple file playback from various sources after the data has been transferred to a storage location. Metadata may also include information relating to the device(s) used to capture or process information (e.g. a unit serial number). From these types of metadata, circumstances that prompted the recording may be inferred and may provide additional information about the recorded information. This metadata may include useful information to correlate recordings from multiple distinct recording systems. This type of correlation information may assist in many different functions (e.g., query, data retention, chain of custody, and so on).

As used throughout this disclosure the term "portable" refers to the ability to be easily carried or moved. The term encompasses a wearable device (i.e. a device that can be worn or carried by a person or an animal).

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are necessarily described for each embodiment disclosed in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure. It will also be appreciated that the parts and component dimensions of the embodiments disclosed herein may not be drawn to scale.

Figure 2:
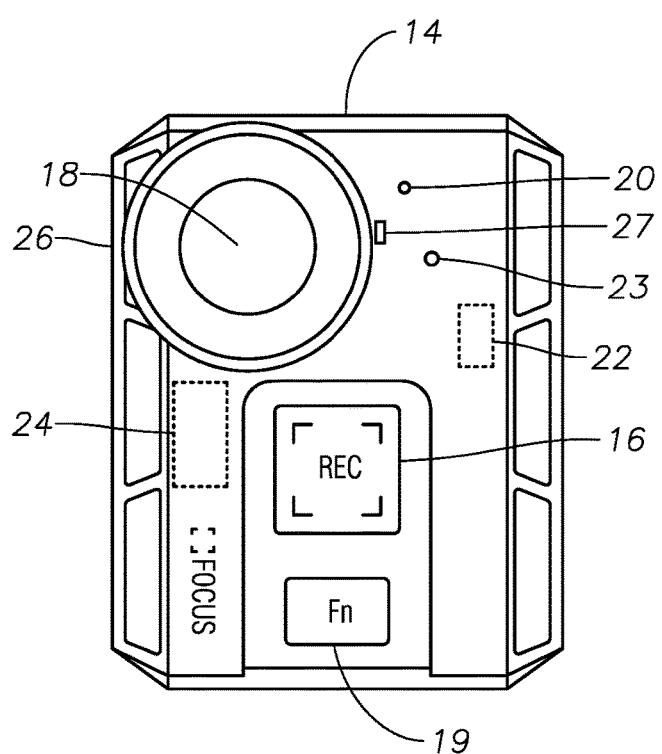
FIG. 2, in accordance with some embodiments of the present disclosure, depicts a portable camera.

FIG. 1 depicts an embodiment of this disclosure. A vehicle 10 (e.g. a police car) is equipped with a docking module 12 and a portable camera 14. Embodiments can be implemented with the docking module 12 and portable camera 14 disposed on any type of vehicle. FIG. 2 depicts a closer view of a portable camera 14 embodiment of this disclosure. In some embodiments, the camera 14 is configured with a record activation switch 16, which permits a user to manually deactivate or activate the camera to record data captured via the lens 18 and microphone 20. Some embodiments may be configured to respectively allow for separate manual activation/deactivation of the microphone 20 and lens 18, respectively, permitting a user to capture only audio data or only image data as desired. Some embodiments may also include a programmable function button 19 that provides a user the ability to select among different programmed/programmable modes of operation. The camera 14 is configured with an internal buffer 22 (e.g. RAM) to temporarily hold captured image data and memory 24 (e.g. hard disk) to store captured image data. Some embodiments may also include an audio buzzer 23 to provide an audible indication during various modes of operation. For example, the buzzer 23 may be configured for activation: when camera 14 recording starts or stops, to provide a camera low battery alert, to provide a camera memory full alert, to indicate successful camera pairing with another device, to provide warning beeps that may be sent from another device, etc. It will be appreciated by those skilled in the art that camera 14 embodiments of this disclosure can be implemented with various types of additional sensors to capture/store desired information (e.g. temperature) and with conventional data storage means as known in the art. Embodiments of the camera 14 are also equipped with internal Bluetooth® circuitry and associated electronics to permit wireless communication and/or signal transfer to or from the camera. Bluetooth® pairing may be manually activated by a button 26 on the camera 14. Some embodiments may also include a light-emitting diode (LED) 27 to indicate when the camera 14 is recording or performing other functions. Suitable camera devices 14 that may be used to implement embodiments of this disclosure include the devices commercially available from COBAN Technologies, Inc., in Houston, Tex. (http//www.cobantech.com).

Figure 3:
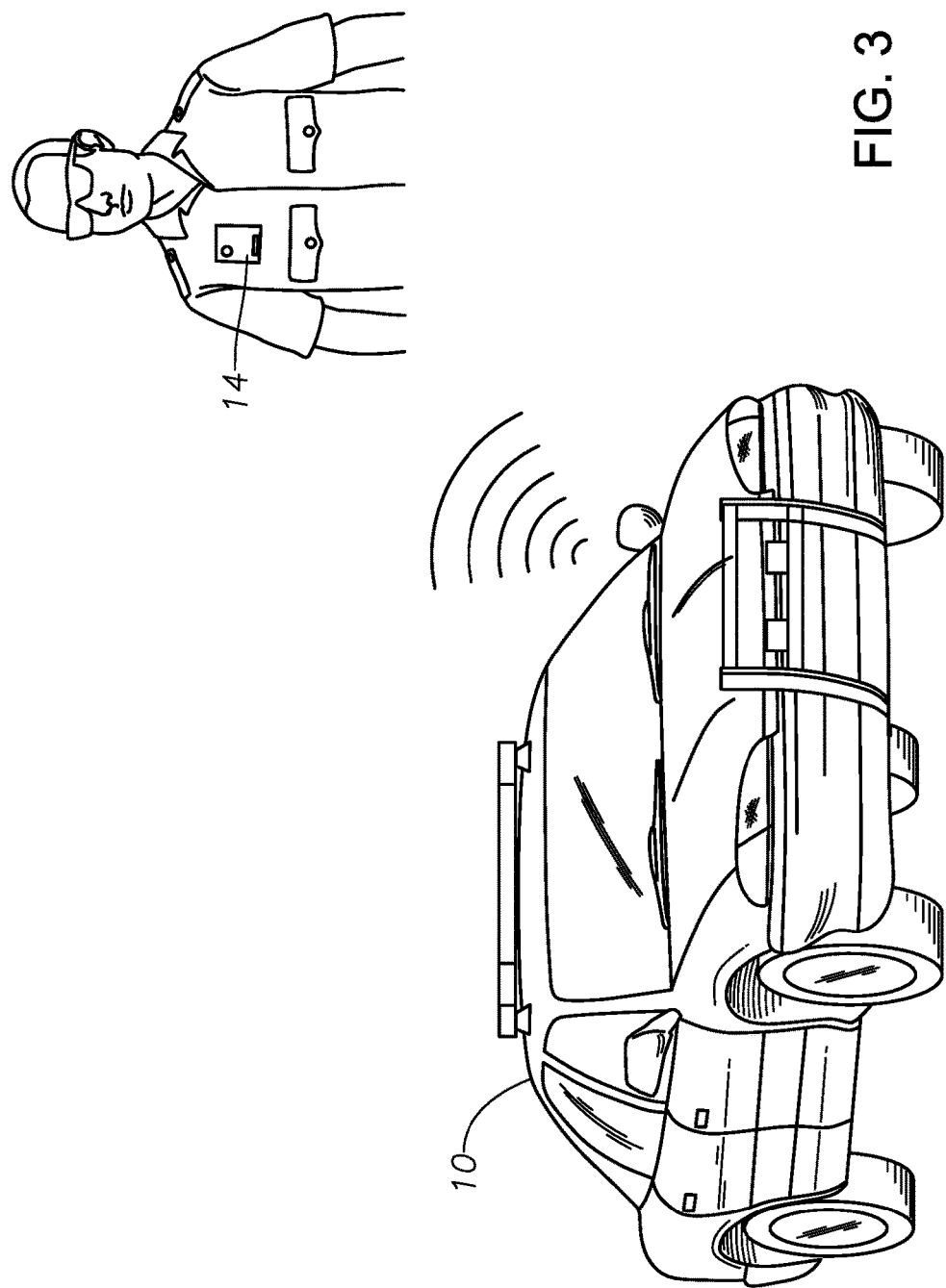
FIG. 3, in accordance with some embodiments of the present disclosure, depicts a communication scheme, specifically between a police vehicle with an onboard docking module and an officer with a body worn camera.

Although the embodiment depicted in FIG. 1 shows the camera 14 disposed in a vehicle 10, other embodiments of this disclosure provide implementations with a fully portable camera. FIG. 3 depicts the camera 14 being worn by a user (e.g. an officer) as a BWC. This implementation provides a user the ability to capture on-scene image data with the camera 14 when the user is not in the vehicle 10. For law enforcement, the wearable camera 14 provides the officer complete freedom to move in and out of wireless communication range with the docking module 12.

Figure 4:
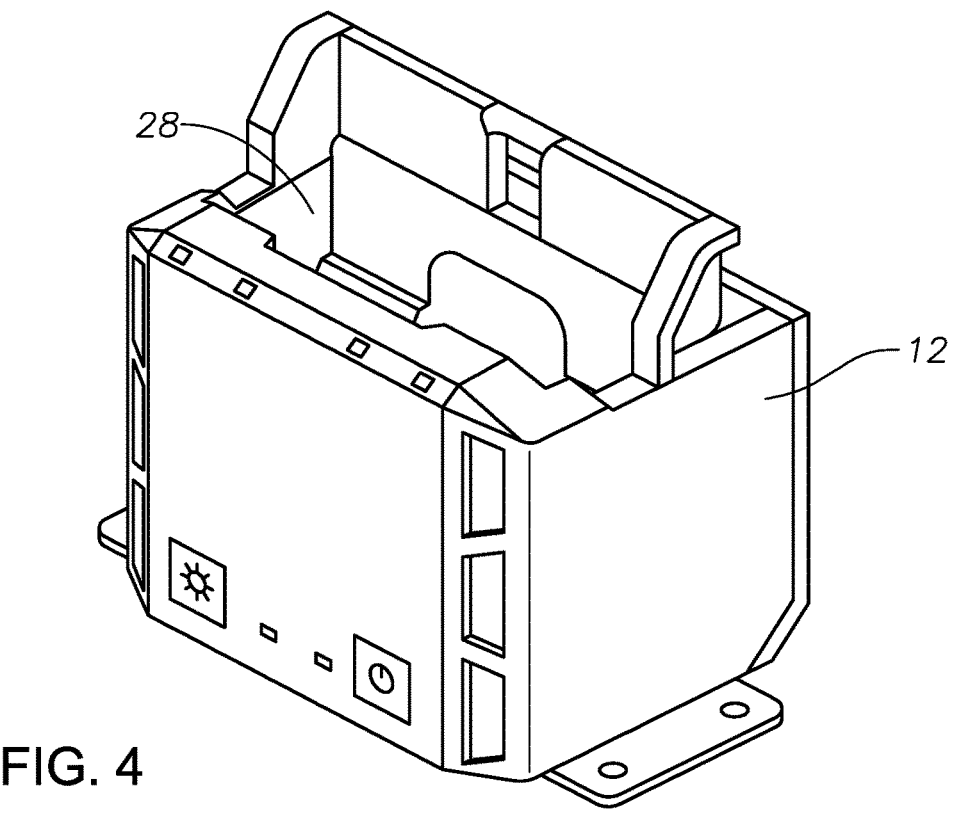
FIG. 4, in accordance with some embodiments of the present disclosure, depicts a perspective view of a docking module.
Figure 5:
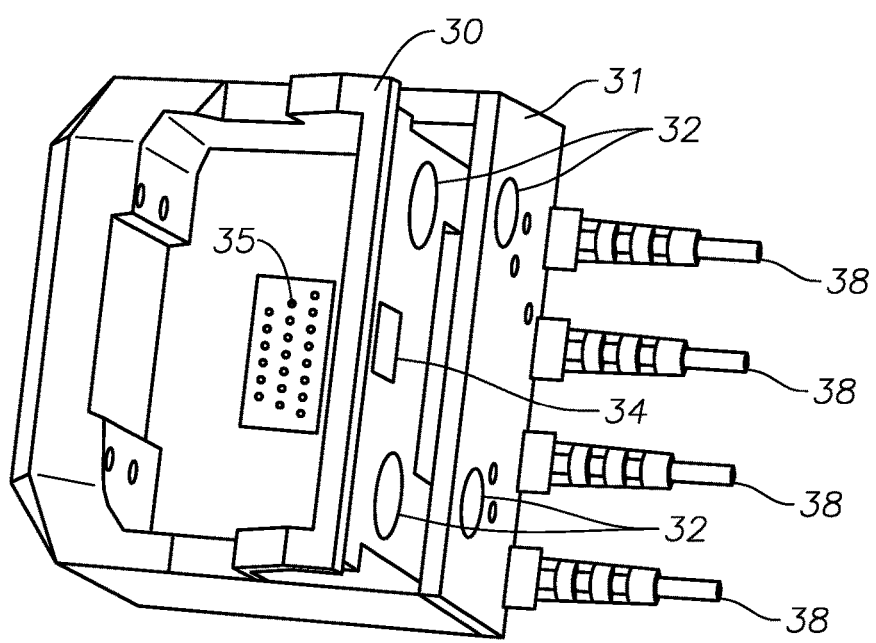
FIG. 5, in accordance with some embodiments of the present disclosure, depicts a top view of a docking module.
Figure 7:
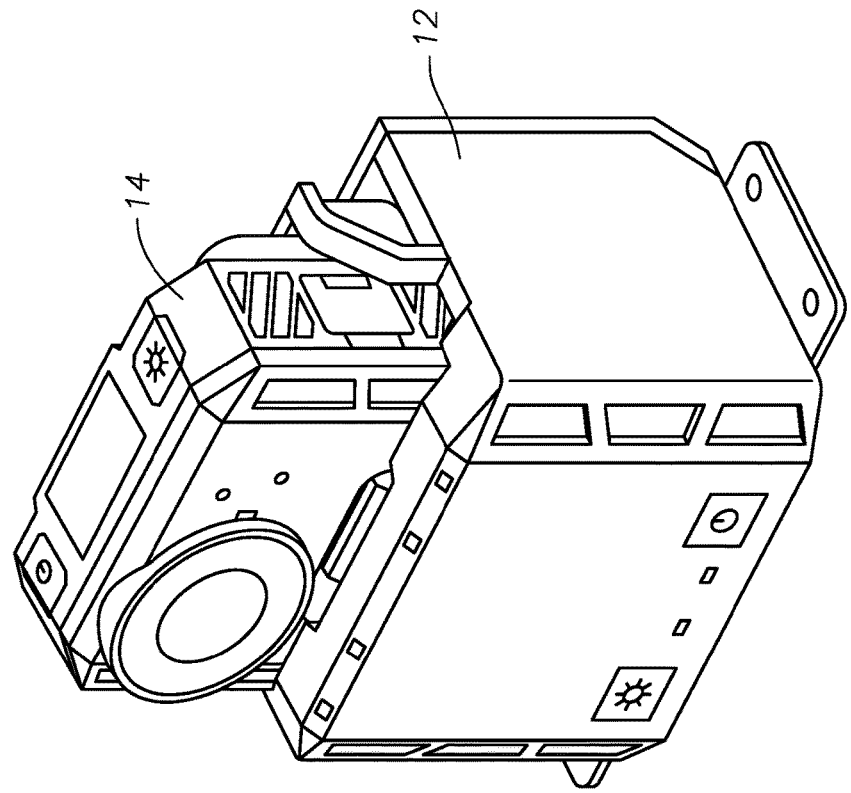
FIG. 7, in accordance with some embodiments of the present disclosure, depicts a schematic of a portable camera docked in a docking module.
Figure 6:
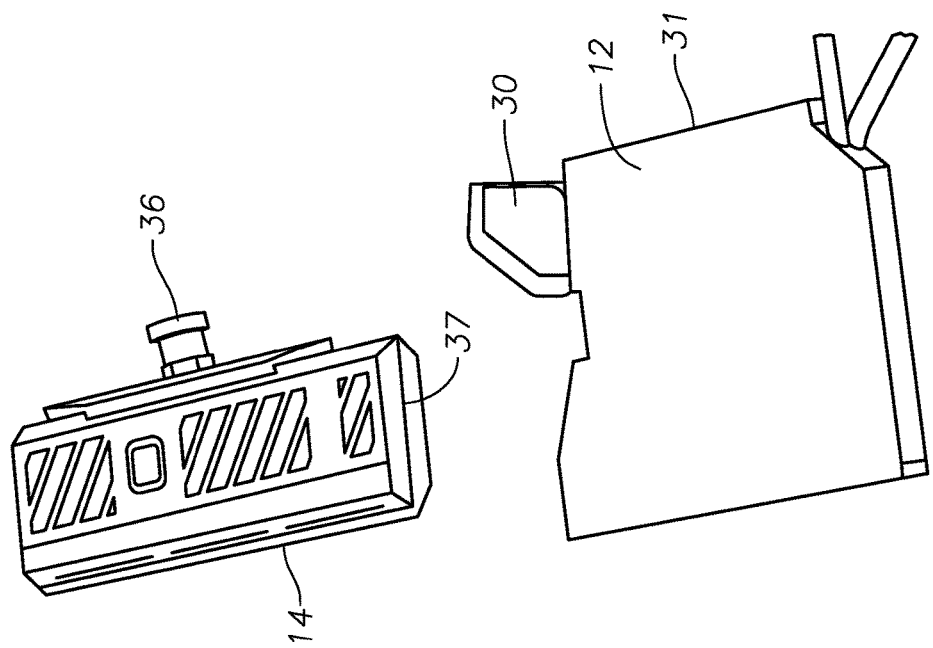
FIG. 6, in accordance with some embodiments of the present disclosure, depicts a schematic of a portable camera and a docking module for docking the camera.

When not in use as a BWC, the camera 14 is held in the docking module 12 in the vehicle 10. FIG. 4 depicts an embodiment of the docking module 12. The docking module 12 provides a slot 28 to cradle and hold the camera 14. In some embodiments, the docking module 12 is configured with an articulating backing plate 30 that is held against the back panel 31 of the module in the open position with embedded magnets 32, as depicted in FIG. 5. When the camera 14 is inserted into the docking module 12, the camera pushes down on pivoting feet on the bottom of the plate 30, which moves the plate forward. The docking module 12 is also equipped with a Pogo pin connection base 35 that accepts the Pogo pins 37 at the bottom of the camera 14 (depicted in FIG. 6) to form an electrical connection. In some embodiments, the camera 14 may be configured with magnets on a mount plate on the back side (not shown) that assist in pulling the plate 30 forward, holding it in place to lock the camera 14 in the docking module 12. FIG. 5 shows an opening 34 in the plate 30 that accepts a protruding stud 36 on the back of the camera 14 (depicted in FIG. 6) when the camera 14 is cradled in the docking module 12, providing additional support to keep the camera 14 locked in under vibration and shock in a mobile environment. FIG. 6 depicts the docking module 12 with the backing plate 30 held against the back panel 31 via the magnets 32 (FIG. 5), ready to receive the camera 14. FIG. 7 depicts the camera 14 housed in the docking module 12. Embodiments of the docking module 12 provide a secure mounting mechanism to hold the camera 14 stable while in the vehicle 10, while at the same time facilitating one-hand operation for the removal of the camera 14. Suitable docking modules 12 that may be used to implement embodiments of this disclosure include the devices commercially available from COBAN Technologies, Inc., in Houston, Tex. (http//www.cobantech-.com).

In some embodiments, the docking module 12 is configured with Bluetooth® circuitry, microprocessors, and electronics to implement the aspects and features disclosed herein. In some embodiments, the docking module 12 is configured with one or more cable connectors 38 (FIG. 5) to connect the module to an onboard computer 29 (FIG. 1) in the vehicle 10. In other embodiments, the computer 29 may be configured with Bluetooth® circuitry, software, and electronics to implement the aspects and features disclosed herein. It will be appreciated by those skilled in the art that other wireless communication standards may be used in implementations of the embodiments disclosed herein (e.g., RuBee, Wi-Fi, 3G, 4G, LTE, etc.).

Embodiments of the docking module 12 are configured to automatically send wireless commands to the portable camera 14 when certain specified conditions are met. The commands cause performance of one or more actions in the camera 14, including: (a) causing image data captured by the camera 14 to be temporarily held in the buffer 22; (b) causing image data captured by the camera 14 not to be held in the buffer 22; (c) causing image data captured by the camera 14 to be stored in memory 24; and (d) causing image data captured by the camera 14 not to be stored in memory 24. Additional description of the docking module 12 command structure is provided in the following disclosure.

In some embodiments, the specified condition that triggers the docking module 12 to send a command to the camera 14 is an input signal received by the docking module 12 from one or more sensors 40 mounted in the vehicle (see FIG. 1). One sensor 40 may be a sensor coupled into or connected to the output of the light bar 42 circuitry and configured to send a signal (e.g. a 12 V DC signal via wiring) to the docking module 12 when the light bar is activated. Another sensor 40 may be a sensor disposed on a gun rack 44 in the vehicle and configured to send a signal (e.g. a 12 V DC signal via wiring) to the docking module 12 when a shotgun is removed from the rack 44. Another sensor 40 may be a vehicle 10 door switch that activates interior lighting in the vehicle when a door is opened. The door switch circuitry may be coupled to the docking module 12 and configured to send a signal (e.g. a 12 V DC signal via wiring) to the docking module 12 when a door is opened. The vehicle 10 may also be equipped with a Controller Area Network (CAN) bus coupled with the docking module 12 to provide the module with input data and signals from the devices and sensors on the vehicle 10, such as the signal indicating a door has been opened. It will be appreciated by those skilled in the art that other sensors (e.g. engine ignition sensor, siren sensor, voice activation sensor, crash detection sensor, etc.) and input signals may be used with implementations of embodiments of this disclosure. Thus, the specified condition that triggers docking module 12 to send a command to camera 14 may be (receipt by the docking module 12 of a sensor signal indicating): activation of the light bar 42; deactivation of the light bar 42; removal of a gun from the gun rack 44; return of a gun to the gun rack 44; opening of a door of the vehicle; closing of a door of the vehicle; activation of the siren; deactivation of the siren; turning on of the engine; turning off of the engine; or another condition. The specified condition that triggers docking module 12 to send a command to camera 14 may also be (receipt by the docking module 12 of a plurality of sensor signals indicating) a combination of any two or more of the aforementioned conditions.

In some embodiments, the specified condition that triggers the docking module 12 to send a command to the camera 14 is when the distance between the location of the camera 14 and the location of the docking module 12 satisfies (i.e., meets or exceeds) a threshold (i.e., a threshold minimum distance or a threshold maximum distance). The docking module 12 and/or the camera 14 can be configured with GPS circuitry and software to automatically calculate the proximity of the camera 14 to the docking module 12. In some embodiments, the software and electronics in the camera 14 and/or the docking module 12 may be configured to use the communication signal (e.g. Bluetooth® signal) to calculate the proximity of the camera 14 to the docking module 12. Other embodiments may be configured with conventional means to calculate the proximity of the portable camera 14 to the docking module 12 as known in the art.

In some embodiments, the specified condition that triggers the docking module 12 to send a command to the camera 14 is when the velocity of the vehicle 10 satisfies (i.e., meets or exceeds) a threshold (i.e., a threshold minimum velocity or a threshold maximum velocity). Velocity data from the vehicle 10 speedometer may be sent to the docking module 12 via the CAN bus. In some embodiments, the velocity data can also be provided from the camera 14 or an onboard GPS.

As previously discussed, the docking module 12 is configured to automatically send wireless commands to the camera 14 to cause performance of one or more actions in the camera when the module is triggered by a specified condition as determined by the disclosed means. In some embodiments, the image data captured by the camera 14 is temporarily held in the buffer 22 in a continuous circulating stream to perform "pre-event" circular buffering, not storing the data to memory 24 until activated to store the data to memory 24 by a wireless command from the docking module 12. This "smart buffering" feature provides a circular buffer that temporarily holds captured image data until the docking module 12 sends a wireless command causing performance of one or more actions in the camera 14 as disclosed herein. The software of the docking module 12 can be configured to send commands to the camera 14 based on any desired configuration of the specified conditions, which configurations can include:

(i) Distance-based buffering—Causing image data captured by the camera 14 not to be held in the buffer 22 if the camera is within a preset specified threshold distance or range from the docking module 12 (e.g. this condition may be satisfied when an officer is sitting in the vehicle). This feature avoids the temporary holding of needless data to the buffer 22, improving overall efficiency and conserving unit power. In some embodiments, when the camera 14 is beyond a preset specified threshold distance or range from the docking module 12, the camera 14 automatically starts holding captured image data in the buffer 22. In some embodiments, when the camera 14 is beyond a preset specified threshold distance or range from the docking module 12, the camera 14 automatically starts storing captured image data to memory 24. In such embodiments, the camera 14 may be configured to require manual deactivation of the image data storing via the record activation/deactivation switch 16 on the camera.

(ii) Sensor signal-based recording—Causing image data captured by the camera 14 not to be held in the buffer 22 if the camera is within a preset specified threshold distance or range from the docking module 12, until the module detects a signal input from a sensor 40 (e.g., lightbar activation, gun rack signal, door opened). If a sensor 40 signal input is detected, the docking module 12 automatically sends a command to the camera 14 to start storing to memory 24 the image data captured by the camera 14. In some embodiments, if a sensor 40 signal input is detected, the docking module 12 automatically sends a command to the camera 14 to transfer or flush to memory 24 any image data that the buffer 22 may be holding and to start storing to memory the image data captured by the camera.

(iii) Vehicle velocity-conditioned sensor signal-based buffering—Causing image data being captured by the camera 14 not to be held in the buffer 22 and not to be stored to memory 24 if the camera is within a preset specified threshold distance or range from the docking module 12 and the vehicle 10: (i) starts moving, (ii) reaches a specified threshold minimum velocity (e.g. 15 MPH), or (iii) exceeds a specified threshold maximum velocity. While in this mode, if the docking module 12 detects a signal input from a sensor 40 (e.g., lightbar activation, gun rack signal, door opened), the module automatically sends a command to the camera 14 to start storing to memory the image data captured by the camera. In some embodiments, while in this mode, the docking module 12 automatically sends a command to the camera 14 to transfer or flush to memory 24 any image data that the buffer 22 may be holding and to start storing to memory the image data captured by the camera 14.

(iv) Distance-conditioned sensor signal-based recording—Causing image data captured by the camera 14 not to be stored in memory 24 if the camera is within a preset specified threshold distance or range from the docking module 12. In this inhibiting mode, so long as the camera 14 is within the specified threshold range, the camera 14 will not resume recording to memory 24, regardless of the sensor 40 signal(s). Once outside the specified threshold range, if a sensor 40 signal is detected, then the camera 14 resumes its storing to memory 24 function.

In some embodiments, the camera 14 is configured to bypass any commands from the docking module 12 and continue storing captured image data to memory 24 if the camera has been activated to store data when the camera is outside of the vehicle 10. For example, when an officer manually activates the camera 14 to store data to memory 24 as he is approaching the vehicle 10. In this mode, the camera 14 will continue to record to memory 24 until the officer deactivates recording manually, regardless of any sensor 40 signal inputs or the satisfaction of specified conditions.

It will be appreciated by those having the benefit of this disclosure that the docking module 12 and camera 14 embodiments can be configured to operate using commands and performing actions based on other configurations of specified conditions and using signal inputs originating from other sensors in the vehicle or outside of the vehicle (not shown). Generally speaking, any command among those described herein may be sent by the docking module 12 to the camera 14 upon any of the following conditions being satisfied: a change in distance between camera 14 and docking module 12; a change in velocity of the vehicle 10 in which the docking module 12 resides; a change in the vehicle 10 acceleration exceeding a threshold; receipt of a sensor 40 signal by the docking module 12 indicating any of the conditions mentioned above (pertaining to the light bar, gun rack, door, siren, engine, voice activation, a crash detection sensor, etc.); any combination of any two or more of the foregoing conditions.

Figure 8:
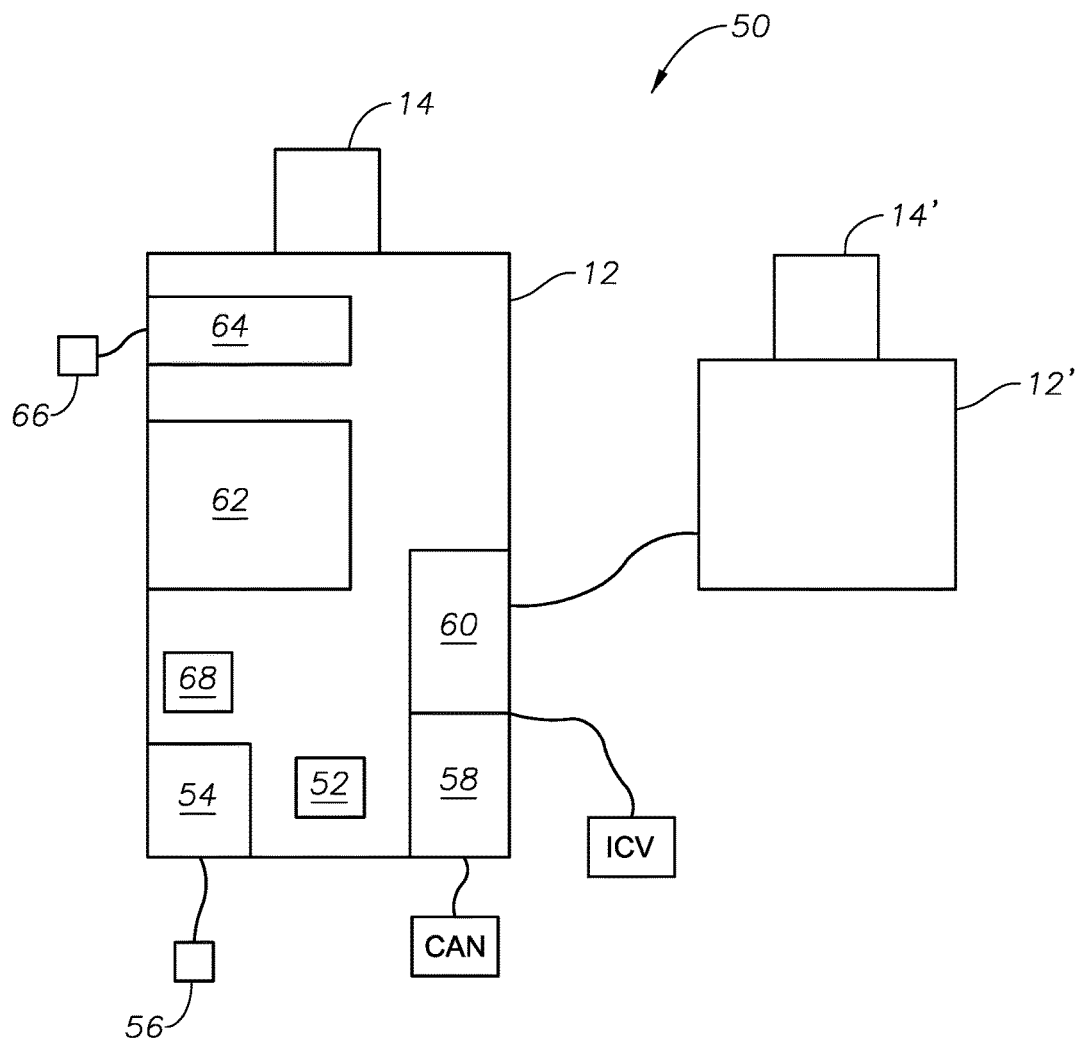
FIG. 8, in accordance with some embodiments of the present disclosure, depicts a block diagram of the circuitry and components of a docking module.

Turning to FIG. 8, a block diagram 50 of the circuitry and components within a docking module 12 embodiment is depicted. Block 52 depicts the power management components (e.g. input 10-30 V DC with over-voltage/surge protection). Block 54 depicts general-purpose input/output (GPIO) circuitry with I/O pigtail connections 56 providing isolated I/O including: power ground, power voltage, sensor 40 inputs (e.g., light bar, gun rack, door, voice activation, crash detection, etc.), and voltage output. Block 58 depicts RS-232 connections comprising: port connect to in-car video system (ICV) as a Near-Field Communication (NFC) login function, port connect to CAN bus for velocity data (disable/enable function combined with proximity detect/velocity detect). Block 60 depicts a USB HUB IC. A first portable camera 14 is docked in docking module 12. A USB cable can connect to the ICV or a laptop computer for data upload/exchange. The docking module 12 may be configured with LEDS to indicate: detection/sync of first camera, detection/sync of second camera, power, light bar, Aux, data exchange via USB such as upload/download or firmware updates. Block 62 depicts a NFC reader module. The NFC reader module may be equipped with an internal NFC antenna (for pairing and ICV login). Block 64 depicts a Bluetooth® radio. The docking module 12 may also be equipped with an external antenna pigtail connection 66 in association with the Bluetooth® radio. Block 68 depicts a buzzer to provide feedback for NFC read or fail. The docking module 12 shown on the left-hand side of FIG. 8 represents the main dock with wireless components, USB hub and power distribution to the ICV or a laptop. The camera 14 is docked to the docking module 12 via a Pogo pin connection (see FIGS. 5-6) for data transfer and charging. A second portable camera 14' may be linked in with a detachable docking module 12', as shown on the right-hand side of FIG. 8. Both cameras 14 and 14' may be linked to the HUB to connect to the ICV over a single USB. The second docking module 12' provides the basic functionality (charging, USB connectivity to the ICV or a laptop, data upload/exchange). Both docking module 12 and docking module 12' may be equipped with a power on/off button and a backlight on/off button (not shown). The general functions provided by the disclosed docking module 12 embodiments include: NFC Bluetooth® auto-pairing, received signal strength indication (RSSI) based proximity/range detection for the linked cameras 14, proximity and/or condition-based smart buffering control (enable/disable circular buffer for pre-event hold), record inhibit or record activation functions based on proximity and condition-based record control, and Pogo pin data exchange via USB and RS-232 connections. The Bluetooth® communications protocol includes available status information sent from the camera 14 to the docking module 12 (e.g., camera firmware version, hardware version, storage status, battery status, record on/off status, mute on/off status, recording resolution, camera IR LED status, etc.). In addition to sending the wireless commands described above, the docking module 12 may also be configured to remotely control other camera functions (e.g., turn on/off mute, turn on/off Wi-Fi, turn on/off camera IR LEDs, etc.).

Figure 9:
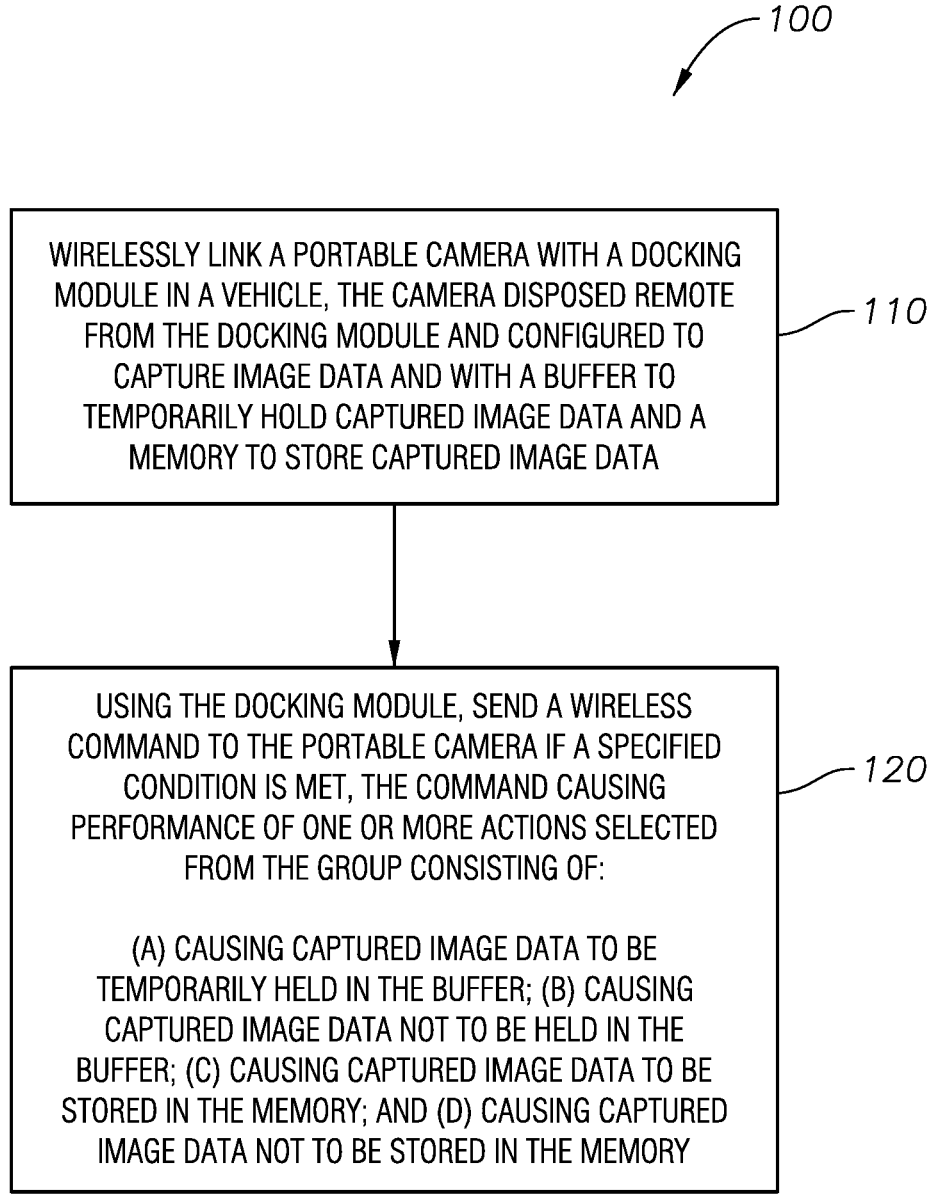
FIG. 9 is a flow chart depicting, at a top level, a method in accordance with some embodiments of the present disclosure.

FIG. 9 is a flow chart depicting a method 100 according to an embodiment of this disclosure. At step 110, a portable camera 14 is wirelessly linked with a docking module 12 disposed in a vehicle 10. The portable camera 14 is disposed remote from the docking module 12 and configured: to capture image data, with a buffer 22 to temporarily hold captured image data, and with a memory 24 to store captured image data. At step 120, using the docking module 12, a wireless command is sent to the portable camera 14 if a specified condition is met. The command causes performance of one or more actions selected from the group consisting of: (a) causing image data captured by the portable camera to be temporarily held in the buffer; (b) causing image data captured by the portable camera not to be held in the buffer; (c) causing image data captured by the portable camera to be stored in the memory; and (d) causing image data captured by the portable camera not to be stored in the memory. This method may be implemented using the techniques and embodiments disclosed herein.

Figure 10:
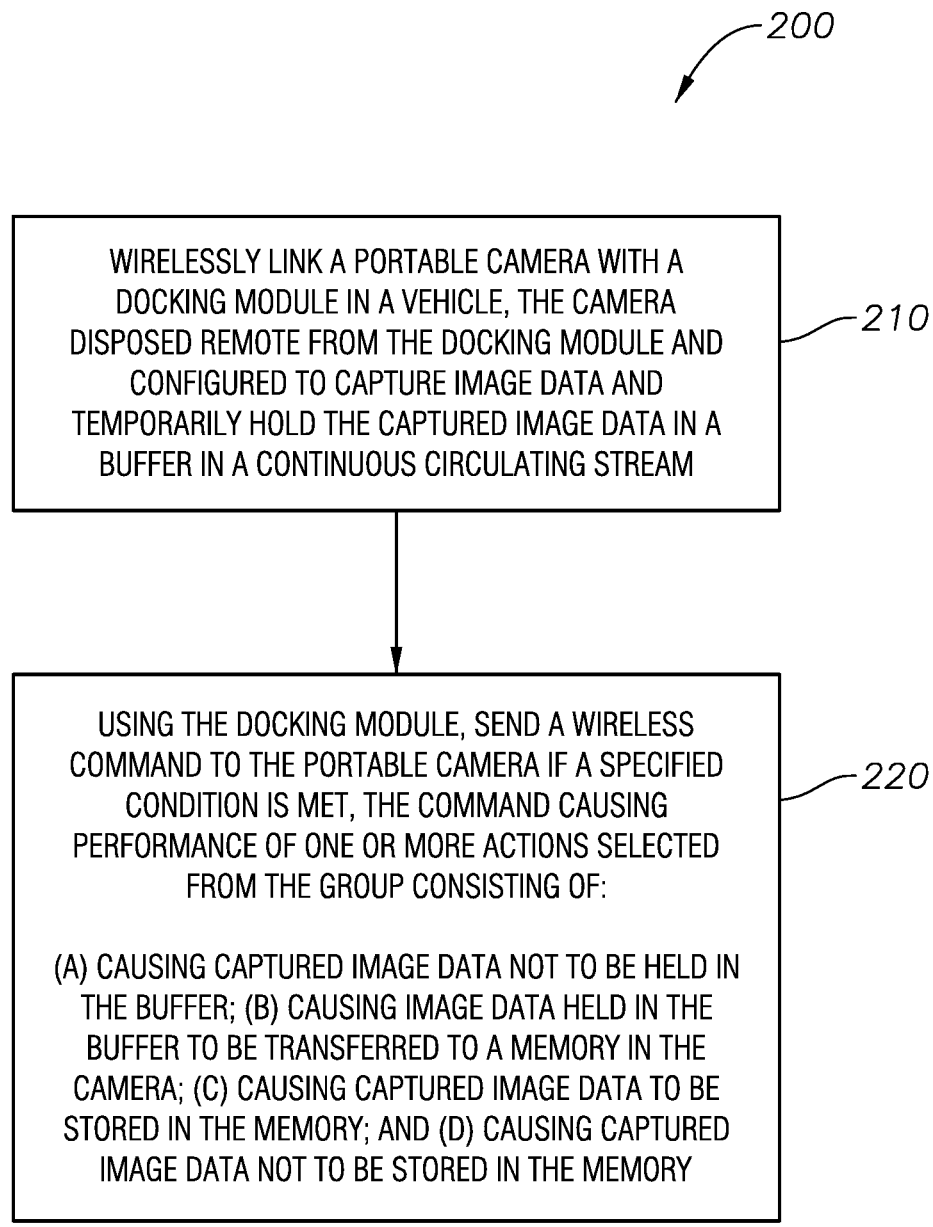
FIG. 10 is a flow chart depicting, at a top level, another method in accordance with some embodiments of the present disclosure.

FIG. 10 is a flow chart depicting a method 200 according to an embodiment of this disclosure. At step 210, a portable camera 14 is wirelessly linked with a docking module 12 disposed in a vehicle 10. The portable camera 14 is disposed remote from the docking module 12 and configured to capture image data and temporarily hold the captured image data in a buffer 22 in a continuous circulating stream. At step 220, using the docking module, a wireless command is sent to the portable camera if a specified condition is met. The command causes performance of one or more actions selected from the group consisting of: (a) causing image data captured by the portable camera not to be held in the buffer; (b) causing image data held in the buffer to be transferred to a memory 24 in the portable camera; (c) causing image data captured by the portable camera to be stored in the memory; and (d) causing image data captured by the portable camera not to be stored in the memory. This method may be implemented using the techniques and embodiments disclosed herein.

In light of the principles and example embodiments described and depicted herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered. This disclosure describes one or more embodiments wherein various operations are performed by certain systems, applications, modules, components, etc. In alternative embodiments, however, those operations could be performed by different components. Also, items such as applications, modules, components, etc., may be implemented as software constructs stored in a machine accessible storage medium, such as an optical disk, a hard disk drive, etc., and those constructs may take the form of applications, programs, subroutines, instructions, objects, methods, classes, or any other suitable form of control logic; such items may also be implemented as firmware or hardware, or as any combination of software, firmware and hardware, or any combination of any two of software, firmware and hardware.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A method, comprising:
disposing a docking module in a vehicle;
disposing a portable camera remote from the docking module and wirelessly linking the portable camera with the docking module, the portable camera configured to capture image data, the portable camera comprising:
a buffer to temporarily hold the captured image data in a continuous circulating stream; and
a memory to store captured image data received from the buffer; and
if the portable camera is located within a specified distance of the docking module, then:
(a) recognizing the portable camera when the portable camera is undocked and detecting operating conditions from signals sent by triggers, the triggers comprising buttons for manual activation, sensors to sense equipment activation, global positioning satellite circuitry to detect distance between the docking module and the portable camera, and a speedometer to detect velocity data of the vehicle; and
(b) receiving the signals and wirelessly sending commands from the docking module to the portable camera based on a desired configuration of operating conditions based on the triggers, the commands comprising:
a do not hold and do not store command to cause the portable camera to not hold the captured image data in the buffer and to not store the captured image data in the memory;
a buffer command to cause the portable camera to temporarily hold the captured image data in the buffer; and
a store command to trigger the portable camera to store to the memory the captured image data held in the buffer; and
if the portable camera has been triggered to store image data to the memory, then activating the portable camera to bypass the commands from the docking module based on the triggers and to continue storing the image data to the memory by overriding any command from the docking module to terminate storing the image data to the memory.

2. The method of claim 1, wherein the commands sent to the portable camera also cause the portable camera to transfer to the memory any image data that is already held in the buffer when the commands are received by the portable camera.

3. The method of claim 1, wherein the sensors comprise a vehicle light bar sensor configured to send a vehicle light bar signal to the docking module when a light bar of the vehicle is activated.

4. The method of claim 1, wherein the sensors comprise a vehicle gun rack sensor configured to send a vehicle gun rack signal to the docking module when a gun is removed from a gun rack of the vehicle.

5. The method of claim 1, wherein the sensors comprise a vehicle door sensor configured to send a vehicle door signal to the docking module when a door of the vehicle is opened.

6. The method of claim 1, wherein the sending of one of the commands to the portable camera is triggered directly by the receiving, by the docking module, of one or more of the signals from one or more of the triggers, without any intermediate event between the receiving, by the docking module, of the one or more of the signals from the one or more of the triggers and the sending of the one of the commands to the portable camera.

7. The method of claim 1, wherein the receiving the signals comprises:
upon receipt, by the docking module, of an indication that a velocity of the vehicle exceeds a threshold velocity, sending a wireless command to the portable camera, the wireless command causing the portable camera to start storing to the memory image data captured by the portable camera.

8. The method of claim 7, wherein the wireless command sent to the portable camera also causes the portable camera to transfer to the memory any image data that is already held in the buffer when the wireless command is received by the portable camera.

9. The method of claim 7, wherein the sending of the wireless command to the portable camera is triggered directly by the receipt, by the docking module, of the indication that the velocity of the vehicle exceeds the threshold velocity, without any intermediate event between the receipt, by the docking module, of the indication that the velocity of the vehicle exceeds the threshold velocity and the sending of the wireless command to the portable camera.

10. The method of claim 1, wherein the portable camera is configured to bypass the commands from the docking module and continue storing the image data to the memory if the portable camera has been activated, at a time when the portable camera is disposed outside of the vehicle, to store captured image data to the memory.

11. A system, comprising:
a docking module disposed in a vehicle;
a portable camera disposed remote from the docking module, the portable camera wirelessly linked with the docking module, the portable camera configured to capture image data, the portable camera comprising:
a buffer to temporarily hold the captured image data in a continuous circulating stream; and
a memory to store captured image data received from the buffer;
wherein the docking module is configured to perform the following operations if the portable camera is located within a specified distance of the docking module:
(a) to recognize the portable camera when the portable camera is undocked and to detect operating conditions from signals sent by triggers, the triggers comprising buttons for manual activation, sensors to sense equipment activation, global positioning satellite circuitry to detect distance between the docking module and the portable camera, and a speedometer to detect velocity data of the vehicle; and
(b) to receive the signals and to wirelessly send commands from the docking module to the portable camera based on a desired configuration of operating conditions based on the triggers, the commands comprising:

a do not hold and do not store command to cause the portable camera to not hold the captured image data in the buffer and to not store the captured image data in the memory;
a buffer command to cause the portable camera to temporarily hold the captured image data in the buffer; and
a store command to trigger the portable camera to store to the memory the captured image data held in the buffer; and
wherein the portable camera is configured such that, if the portable camera has been triggered to store image data to the memory, the portable camera is activatable to bypass the commands from the docking module based on the triggers and to continue storing the image data to the memory by overriding any command from the docking module to terminate storing the image data to the memory.

12. The system of claim 11, wherein the wireless commands sent to the portable camera also cause the portable camera to transfer to the memory any image data that is already held in the buffer when the wireless commands are received by the portable camera.

13. The system of claim 11, wherein the sensors comprise a vehicle light bar sensor configured to send a vehicle light bar signal to the docking module when a light bar of the vehicle is activated.

14. The system of claim 11, wherein the sensors comprise a vehicle gun rack sensor configured to send a vehicle gun rack signal to the docking module when a gun is removed from a gun rack of the vehicle.

15. The system of claim 11, wherein the sensors comprise a vehicle door sensor configured to send a vehicle door signal to the docking module when a door of the vehicle is opened.

16. The system of claim 11, wherein the sending of one of the commands to the portable camera is triggered directly by the receiving, by the docking module, of one or more of the signals from one or more of the triggers, without any intermediate event between the receiving, by the docking module, of the one or more of the signals from the one or more of the triggers and the sending of the one of the commands to the portable camera.

17. The system of claim 11, wherein the docking module is further configured to perform the following:
upon receipt, by the docking module, of an indication that a velocity of the vehicle exceeds a threshold velocity, send a wireless command to the portable camera, the wireless command causing the portable camera to start storing to the memory image data captured by the portable camera.

18. The system of claim 17, wherein the wireless command sent to the portable camera also causes the portable camera to transfer to the memory any image data that is already held in the buffer when the wireless command is received by the portable camera.

19. The system of claim 17, wherein the sending of the wireless command to the portable camera is triggered directly by the receipt, by the docking module, of the indication that the velocity of the vehicle exceeds the threshold velocity, without any intermediate event between the receipt, by the docking module, of the indication that the velocity of the vehicle exceeds the threshold velocity and the sending of the wireless command to the portable camera.

20. The system of claim 11, wherein the portable camera is configured to bypass the commands from the docking module based on the triggers and to continue storing the image data to the memory if the portable camera has been activated, at a time when the portable camera is disposed outside of the vehicle, to store captured image data to the memory.

21. The system of claim 11, wherein the portable camera is configured to dock with the docking module to: (i) electrically charge the portable camera, (ii) enable data transfer to or from the portable camera through the docking module, or (iii) enable data exchange between the portable camera and the docking module.

* * * * *